March 1, 1966  B. F. HAY  3,238,489
ELECTRICAL RESISTOR
Filed June 11, 1962

INVENTOR.
BERNARD F. HAY
BY
Talbert Dick & Zarley
ATTORNEYS

WITNESS
NORMAN G. TRAVISS

United States Patent Office 3,238,489
Patented Mar. 1, 1966

3,238,489
ELECTRICAL RESISTOR
Bernard F. Hay, Columbus, Nebr., assignor to
Dale Electronics, Inc., Columbus, Nebr.
Filed June 11, 1962, Ser. No. 201,363
6 Claims. (Cl. 338—250)

This invention relates to a means for insulating and dispersing the heat of electronic units such as electrical resistors and the like.

Perhaps no electrical device has experienced more problems than that of electrical resistor devices. Obviously, the problems develop from inadequate heat dissipation, improper insulation and tendency to break or crash in usage. Most resistors consist of a core upon which the resistance wire is wound, or the ceramic core is plated or is impregnated with resistance particles. It is the coating or housing of the resistor that causes most failures. Many attempts have been made to solve resistor and like problems. To aid in protecting the resistor, some cast or imbed the unit in a metal housing with a solid substance between the resistor and the housing.

The object is that when the resistor develops high temperatures under electrical loads, the heat will transfer to the metal housing and dissipate into the atmosphere and/or to the metal support upon which the housing is mounted.

Different materials for surrounding the resistor units have been tried. The coating matter should have the qualities of insulation, heat dissipation, thermal protection, humidity protection, maintaining solidification and shock, and breakage-proof. While some coatings or castings solve certain requirements, no treatment herebefore used has been entirely satisfactory.

As an illustration, electrical devices can be sealed inside ceramic tubes to provide high temperature humidity and solvents protection. However, it is difficult to hermetically seal them, and the units are liable to mechanical damage, due to brittleness of the ceramic. Also, they are bulky in physical size, and the ceramic does not successfully dissipate generated heat.

Sealing in glass, such as borosilicate, is economical, affords high temperature and moisture protection, but are fragile and are not suited to unusual lead terminations nor for particularly heat sensitive elements. Silicone varnish dip-coatings have good thermal stability, good moisture resistance, fair solvent resistance, but are frequently difficult to apply.

Also, they are subject to pinholes and thus electrical insulation failures and are not good thermal conductors.

Silicone polymers, highly filled with inorganic materials such as alumina, mica, asbestos, silica or metallic oxides ordinarily have good thermal stability, fair moisture resistance, but have poor solvent resistance, manufacturing difficulties associated with maintaining the filler in suspension and in proper ratio. Some have good heat dissipating properties (depending on choice and amounts of fillers included).

Vitreous enamels have thermal stability, moisture and solvent resistance, fair heat conductivity, but must be applied or fuzed at high temperatures and are not suitable for, as an example, precision wirewound resistors.

Sleeves or tapes of various polyesters, fluorocarbons, glass fibers, phenolics and silicones, alone or in combination are expensive to apply, are good electrical insulators, withstand thermal shock, but are poor heat conductors. These sleeved or taped resistors can be inserted into metallic housings, or thin sleevings such as aluminum, to increase the heat dissipation, but at a greater manufacturing cost, larger physical size, and attendent difficulties in centering the resistor in the housing and subsequently filling the remaining space.

Ceramic cements have high temperature applications, are moisture resistant, but prone to crack or fracture and are not suitable for miniature and precision applications.

As herebefore indicated, a metal housing in which the resistor element is suspended is highly desirable. The casting material surrounding the resistor element must provide mechanical and chemical protection, and electrical insulation.

Therefore one of the principal objects of my invention is to provide an electrical resistor or like that is capable of successfully dissipating heat while still having proper insulation characteristics.

A further object of this invention is to provide a heat dissipating means for resistors and like that distributes the dissipating heat evenly, uniformly thus eliminating "hot spots."

A still further object of this invention is to provide a means for insulating resistors and the like that is not brittle.

Still further objects of my invention are to provide a means for treating resistors and like that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Figure 1:
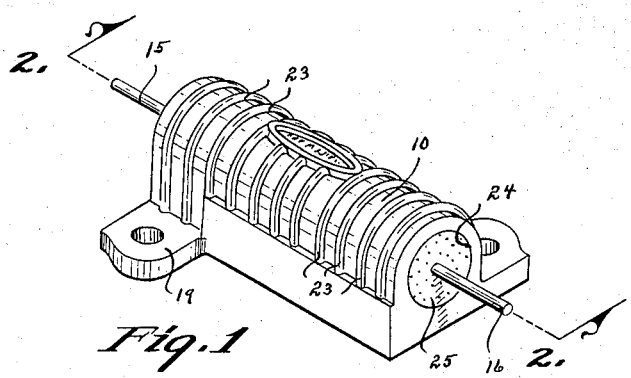
FIG. 1 is a perspective view of a resistor using my invention.

Insulating material is chosen to accord a high degree of thermal stability and good electrical resistance and may comprise phenolics, polyesters, epoxies, and silicones, both as potting compounds and as molding materials.

These materials are commonly filled with inorganic material such as silica, alumina, asbestos, mica, mineral pigment, or occasionally organic materials such as polyesters and fluorocarbons to increase their ability to withstand higher temperatures, and to attempt to enhance heat conductivity.

It can be readily seen that with a high temperature source, i.e., the resistance element, with a housing of high thermal conductivity, which may be finned to further enhance its ability to dissipate heat (it being the object to transfer as much generated heat as possible, as rapidly as possible), it is highly desirable to have an electrical insulating material that enhances the heat transfer, and not act as a thermal barrier.

The present invention utilizes the conventional insulating compound just recited, either singly or suitably modified combinations of them, and into which I impregnate a filler material, i.e., beryllia flour. This beryllia flour is of such particle size and percentage or composition (based on weight of insulating compound), that the insulating volume, has a heat transfer rate approaching that of the metallic housing. The beryllia flour is not electrically conductive, such as would metal particles, it being appreciated that there is ordinarily a direct correlation between electrical and thermal conductivities.

The mechanism of heat dissipation begins with the heat generated by resistance wire under power. The beryllia particles provide both and thermally conductive path because of their physical juxtaposition within the insulating material, and a radiator effect on that they radiate thermal energy in all directions (perpendicular to the particle surface) and thus spread the heat evenly throughout.

The resistor core may be composed commonly of alumina, steatite, mullite, etc., and may be composed of beryllia. In a high-density beryllia core the mass of the core, solid or tubular, further improves the rapidity and evenness of heat dissipation. In all cases the end caps, the lead wires and mounting chassis, of the resistor aid measurably in contributing to the removal of heat, especially when it is diffused evenly throughout the entire device.

An illustrative example of my invention is shown in the drawings.

Figure 2:
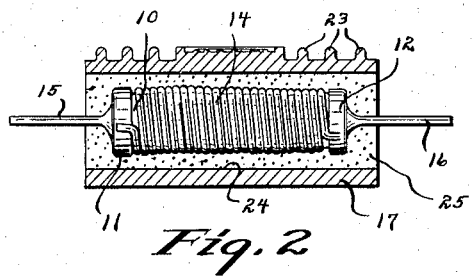
FIG. 2 is a longitudinal sectional view of the resistor and more fully illustrated its construction.

As herebefore indicated, the preferred resistor is one that is compact, and one that will withstand severe impacts large electrical loads and high temperatures without fracture or malfunction. While this invention may be employed for other electrically heatable units, I am particularly concerned with the proper and desirable fabrication of electrical resistors. The physical features of ordinary electrical resistors consist of a cylindrical body 10 having thereon the usual wire coil 14 and caps 11 and 12 at each end, respectively, of the body 10. Such resistors have the usual two lead conductors 15 and 16 extending outwardly through the two end caps 11 and 12, respectively, as shown in FIG. 2.

Such a resistor is limited in the load it will carry depending on its size, and in order to accommodate the maximum loads required, it is necessary to employ much larger resistors than desirable in order to prevent excessive heating, fracture, or other damage. It is essential and important to provide for greater heat-dissipation than heretofore possible in order to employ a resistor of small size while carrying maximum electrical loads.

To produce a desirable resistor unit, my first step is to place, loosely around, the cylinder portion or body 10, an aluminum hollow cylinder 17. This cylinder is open at both ends at this stage of assembly and the two leads 15 and 16 extend through these two open ends respectively. One side of the hollow cylinder is flat to form a base portion 19 for engagement with a supporting base, frame, chassis, or like.

Cooling ribs or flanges 23 may be formed on the outer periphery of the hollow cylinder 17. The bore 24 of the hollow cylinder is substantially greater than that of the diameter of the inserted resistor. Also, it will be appreciated that the bore of the hollow cylinder is of sufficient length to more than embrace the body 10 and cap 11 and 12 of the resistor. After the resistor is properly spaced and positioned within the bore 24, my next step is to fill all spaces inside the bore and around the resistor by suitable castable insulation material.

As herebefore indicated I mix beryllia flour with the castable insulation material, which may be in the classifications of epoxys, phenolics or silicones. These three compounds, with my filler of beryllia flour are excellent for transfer molding. This mixed castable compound 25 is placed in the housing and around the resistor and when solidified produces a unit as shown in FIG. 2. The matter 25 may if desired be pressure cast into the metallic housing. With the plastic material hardened, the device is ready for use.

My invention provides a coating material that has high thermal stability to 350° C., resilience to thermal shock, moisture resistance, mechanically tough, physically strong, chemically inert, is economic to apply, is an outstanding thermal conductor, excellent electrical insulator, and can be applied and cured under conventional conditions.

A standard resistor can be dip-coated, potted, molded or otherwise protected in the usual sense with resinous or polymeric material containing as the essential filler, beryllia flour, and may include other minerals or pigments, primarily as colorants.

The presence of beryllia in the coating compound serves to dissipate generated heat very rapidly, uniformly—in contradistinction to present coatings, such as mineral-filled silicone based coatings, where narrow "hot spots" develop because, heat can be generated at a rate greatly in excess of the rate of thermal dissipation, thus limiting the maximum power rating possible for a given maximum hot spot temperature. Instead of a narrow hot spot band in the center of a resistor, essentially the entire unit is uniformly heated and the heat is conducted through the coating to the atmosphere, to the end caps, to the lead wires, and to the resistor core. The beryllia particles function both as effectively continuous heat paths from the wire element, or as radiators wherein the heat is uniformly scattered and rapidly dissipated. The beryllia provides for a much higher temperature to be attained with a given coating material than it has without a filler, consistent with the usual practice of incorporating refractory fillers in conventional coatings, however, while increasing the thermay stability and electrical insulation, thermal conductivity is outstandingly enhanced.

As herebefore indicated, beryllia flour is excellent for conducting and dissipating heat while at the same time it does not, however, objectionably carry electric currents. Therefore the beryllia flour may be mixed into the core 10 at the time of its manufacture. Such a core 10 impregnated with beryllia flour will not in itself conduct electricity but it will aid in conducting and dissipating heat. In fact, some of the new type resistors merely have the core 10 impregnated with metallic particles or like and it therefore becomes a resistor per se. I find that it is possible with such impregnated resistors to mix therewith, beryllia flour at time of manufacture, beryllia flour without in any way affecting the resistor characteristics of the device but does aid in the transfer and dissipating of heat.

Some changes may be made in the construction and arrangement of my method of and means for insulating and dispersing the heat of electronic units without departing from the real spirit and purpose of my invention, and it is my intention to cover by my claims, any modified forms of structure or use of mechanical equivalents which may be reasonably included within their scope.

I claim:
1. In an electrical resistor, comprising,
   a rigid metallic housing,
   a bore of uniform diameter in said housing,
   a resistor unit in said bore and having an electrical resistance element on the outer surface of a solid insulative core,
   said resistor unit being in spaced relationship to said bore,
   and only a single casting material in said bore and in direct contact with said resistance unit,
   said casting material completely filling the space between said bore and said resistance element and being comprised of a solidifying carrier impregnated with particles of beryllia flour whereupon said beryllia flour will serve to quickly dissipate heat from said resistance element outwardly to said housing.

2. The resistor of claim 1 wherein said solidifying carrier is comprised of epoxy plastic.

3. The resistor of claim 1 wherein said solidifying carrier is comprised of silicone.

4. The resistor of claim 1 wherein said insulative core of said resistor unit is comprised of a non-conducting beryllia substance.

5. In an electrical resistor, comprising,
   a rigid metallic housing,
   a bore of uniform diameter in said housing,
   a resistor unit in said bore and having an electrical resistance element on the outer surface of a solid insulative core,
   said resistor element being in spaced relationship to said bore,
   and only a single casting material in said bore and in direct contact with said resistance unit,
   said casting material completely filling the space between said bore and said resistance unit and being comprised of a solidifying carrier impregnated with particles of beryllia flour whereupon said beryllia flour will serve to quickly dissipate heat from said resistance element outwardly to said housing; the thermal conductivity of said casting material being substantially that of said metallic housing.

6. The resistor of claim 5 wherein said insulative core of said resistor unit is comprised only of a non-conducting beryllia substance.

References Cited by the Examiner

UNITED STATES PATENTS

| | | | |
|---|---|---|---|
| 1,655,857 | 1/1928 | Cunard | 338—251 X |
| 1,981,878 | 11/1934 | Ruben | 338—257 |
| 2,075,876 | 4/1937 | Von Wedel | 338—257 X |
| 2,130,715 | 9/1938 | Coupier | 29—155.64 |
| 2,199,879 | 5/1940 | Deroche | 29—155.64 |
| 2,369,045 | 2/1945 | Hampton et al. | 338—250 |
| 2,500,449 | 3/1950 | Bradley | 260—32.8 |
| 2,558,798 | 7/1951 | Thom | 338—250 |
| 2,640,132 | 5/1953 | Thom | 338—228 |
| 2,734,344 | 2/1956 | Lindenblad | 62—3 |
| 2,832,875 | 4/1958 | Norton | 338—264 X |
| 2,898,236 | 8/1959 | Long | 117—124 |
| 2,885,522 | 5/1959 | Major et al. | 338—257 |
| 2,948,930 | 8/1960 | Herbst | 264—71 |
| 3,039,987 | 6/1962 | Elbling | 260—37 |
| 3,085,316 | 4/1963 | Nelson | 29—155.63 |

FOREIGN PATENTS 472,611   9/1937   Great Britain.

RICHARD M. WOOD, *Primary Examiner.*